US009065276B2

(12) United States Patent
Kim et al.

(10) Patent No.: US 9,065,276 B2
(45) Date of Patent: Jun. 23, 2015

(54) OVER-VOLTAGE PROTECTION DEVICE FOR RESONANT WIRELESS POWER TRANSMISSION DEVICE AND METHOD FOR CONTROLLING THE OVER-VOLTAGE PROTECTION DEVICE

(71) Applicant: Samsung Electronics Co., Ltd., Gyeonggi-do (KR)

(72) Inventors: Yu-Su Kim, Gyeonggi-do (KR); Se-Ho Park, Gyeonggi-do (KR); Kang-Ho Byun, Gyeonggi-do (KR); Sung-Ku Yeo, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 117 days.

(21) Appl. No.: 13/722,211

(22) Filed: Dec. 20, 2012

(65) Prior Publication Data
US 2013/0176652 A1 Jul. 11, 2013

(30) Foreign Application Priority Data

Jan. 11, 2012 (KR) .................... 10-2012-0003341

(51) Int. Cl.
| H02H 1/04 | (2006.01) |
| H02H 3/20 | (2006.01) |
| H02H 9/04 | (2006.01) |
| H02J 5/00 | (2006.01) |
| H02J 17/00 | (2006.01) |
| H02J 7/02 | (2006.01) |
| H01F 38/14 | (2006.01) |

(52) U.S. Cl.
CPC . H02H 3/20 (2013.01); H02H 9/04 (2013.01); H02H 9/045 (2013.01); H02J 17/00 (2013.01); H02J 7/025 (2013.01); H01F 38/14 (2013.01); H02J 5/005 (2013.01)

(58) Field of Classification Search
USPC ...................... 361/86, 113; 307/104
See application file for complete search history.

(56) References Cited

U.S. PATENT DOCUMENTS

| 8,129,864 | B2* | 3/2012 | Baarman et al. ............. 307/104 |
| 2008/0079392 | A1* | 4/2008 | Baarman et al. ............. 320/108 |
| 2008/0174263 | A1 | 7/2008 | Ghode et al. |
| 2009/0174263 | A1* | 7/2009 | Baarman et al. ............. 307/104 |
| 2011/0248673 | A1* | 10/2011 | Aerts et al. .................. 320/108 |
| 2011/0278949 | A1* | 11/2011 | Tsai et al. ..................... 307/104 |
| 2012/0223591 | A1* | 9/2012 | Cheon et al. ................. 307/104 |
| 2013/0176652 | A1* | 7/2013 | Kim et al. ....................... 361/86 |
| 2013/0176653 | A1* | 7/2013 | Kim et al. .................... 361/91.6 |
| 2013/0342161 | A1* | 12/2013 | Byun et al. ................... 320/108 |

(Continued)

FOREIGN PATENT DOCUMENTS

EP 2 375 534 10/2011

Primary Examiner — Ronald W Leja
(74) Attorney, Agent, or Firm — The Farrell Firm, P.C.

(57) ABSTRACT

Provided is an over-voltage protection device for a resonant wireless power transmission device. The over-voltage protection device includes an amplifier for amplifying a transmission signal, a resonance signal generator for generating a wireless resonance signal according to the transmission signal amplified by the amplifier, a voltage detector for sensing a voltage of the wireless resonance signal generated by the resonance signal generator, and a controller for monitoring the voltage detected by the voltage detector to determine whether the voltage repetitively increases and decreases with periodicity when the voltage is greater than a reference voltage and controlling the amplifier to decrease an output of the transmission device by a value according to a result of the determination.

12 Claims, 15 Drawing Sheets

(56) References Cited

U.S. PATENT DOCUMENTS

| | | | |
|---|---|---|---|
| 2014/0015330 A1* | 1/2014 | Byun et al. | 307/104 |
| 2014/0063666 A1* | 3/2014 | Kallal et al. | 361/56 |
| 2014/0077614 A1* | 3/2014 | Park et al. | 307/104 |
| 2014/0327409 A1* | 11/2014 | Lee et al. | 320/137 |
| 2014/0375251 A1* | 12/2014 | Sakai et al. | 320/107 |
| 2015/0022145 A1* | 1/2015 | Kim et al. | 320/108 |

* cited by examiner

OVER-VOLTAGE PROTECTION DEVICE FOR RESONANT WIRELESS POWER TRANSMISSION DEVICE AND METHOD FOR CONTROLLING THE OVER-VOLTAGE PROTECTION DEVICE

PRIORITY

This application claims priority under 35 U.S.C. §119(a) to a Korean Patent Application filed in the Korean Intellectual Property Office on Jan. 11, 2012 and assigned Ser. No. 10-2012-0003341, the contents of which are incorporated herein by reference.

BACKGROUND OF THE INVENTION

1. Field of the Invention

The present invention relates generally to a wireless power transmission and reception technique applied to a wireless charging technique, and more particularly, to an over-voltage protection device for a transmission device in a resonant wireless power transmission and reception technique and a method for controlling the over-voltage protection device.

2. Description of the Related Art

A wireless charging (or non-contact charging) technique using wireless power transmission and reception has recently been developed and used for various electronic devices. The wireless charging technique allows a user to automatically charge a battery by simply placing it on a charging deck without connecting a device such as a cellular phone, to a separate charging connector.

Wireless electric toothbrushes and wireless electric shavers are commonly known devices that use the wireless charging technique. The wireless power transmission and reception technique may increase sealing force and waterproof features as it wirelessly charges electronic products and thus does not need an external charging terminal, and may also increase portability of electronic devices because it does not require wired chargers. The wireless charging related technique is expected to evolve significantly in the growing era of electric vehicles.

The wireless charging technique roughly includes an electromagnetic induction scheme using coils, a resonant scheme using resonance, and a Radio Frequency (RF)/microwave radiation scheme that converts electrical energy into a microwave and transfers the energy. An electromagnetic induction-based power transmission method involves transferring power between a primary coil and a secondary coil. The resonant scheme uses frequency resonance between a transmission device and a reception device that use a resonance frequency.

In the wireless power transmission and reception technique, when abnormal conditions occur, such as incorrect placement of a reception device on a charging deck of a transmission device, the reception device is abnormal, or a metallic substance is placed on the charging deck, excessive power beyond a normal value may be generated in the reception device. Therefore, a wireless power transmission and reception system as well as the reception device essentially require an over-voltage protection circuit.

For the over-voltage protection circuit, a Zener diode may be included in the reception device. However, the Zener diode needs a preparation period corresponding to a time necessary for its operation, and in that preparation period, over-voltage protection is difficult to achieve. Moreover, as the amount of power to be handled increases, the size and capacity of the required Zener diode also increases. In this case, there may be significant restrictions on a mounting size.

Such restrictions make it difficult to include a corresponding wireless power reception device in a portion of an electronic device for which a size limitation is vital. As such, there is a need in the art for an over-voltage protection circuit capable of achieving rapid handling and having high efficiency while reducing a mounting size in wireless power transmission and reception devices.

SUMMARY OF THE INVENTION

Accordingly, the present invention provides an over-voltage protection device for a resonant wireless power transmission device, which achieves rapid handling, has high efficiency, easily handles a high over-voltage, and solves a mounting size problem, and a method for controlling the over-voltage protection device.

According to an aspect of the present invention, there is provided an over-voltage protection device for a resonant wireless power transmission device, including an amplifier for amplifying a transmission signal, a resonance signal generator for generating a wireless resonance signal according to the transmission signal amplified by the amplifier, a voltage detector for sensing a voltage of the wireless resonance signal generated by the resonance signal generator, and a controller for monitoring the voltage detected by the voltage detector to determine whether the voltage repetitively increases and decreases with periodicity when the voltage is greater than a reference voltage and controlling the amplifier to decrease an output of the transmission device by a preset value according to a result of the determination.

According to another aspect of the present invention, there is provided an over-voltage protection method of an over-voltage protection device for a resonant wireless power transmission device. The over-voltage protection method includes monitoring a voltage of a wireless resonance signal of a resonance stage, determining whether the voltage of the resonance stage greater repetitively increases and decreases with periodicity when being greater than a reference voltage, and decreasing an output of the transmission device by a preset value according to a result of the determination.

BRIEF DESCRIPTION OF THE DRAWINGS

The above and other features and advantages of an embodiment of the present invention will be more apparent from the following detailed description taken in conjunction with the accompanying drawings, in which.

DETAILED DESCRIPTION OF EMBODIMENTS OF THE PRESENT INVENTION

Figure 1:
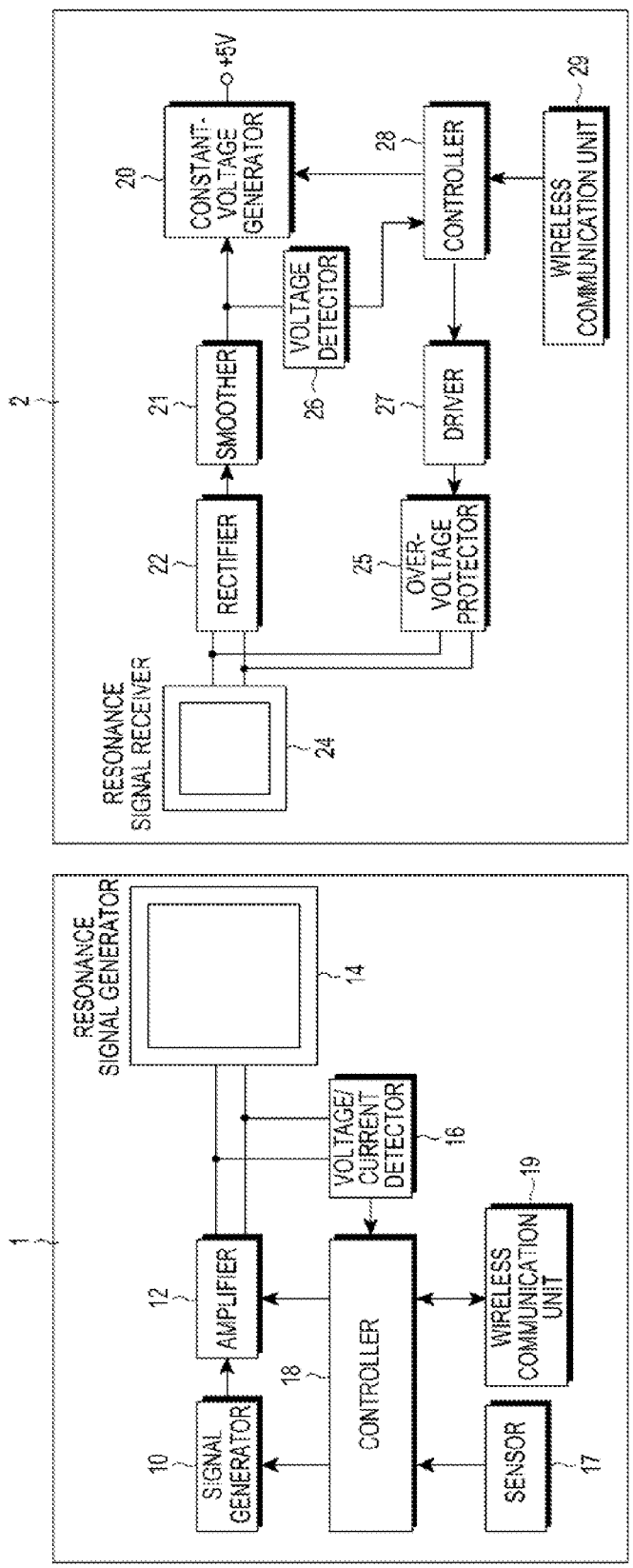
FIG. 1 illustrates a resonant wireless power transmission and reception system according to an embodiment of the present invention.

Hereinafter, embodiments of the present invention will be described in detail with reference to the accompanying drawings. In the following description, the same or similar elements may be designated by the same reference numerals in different drawings. Further, detailed descriptions of known functions and configurations incorporated herein may be omitted for the sake of clarity and conciseness.

Figure 2:
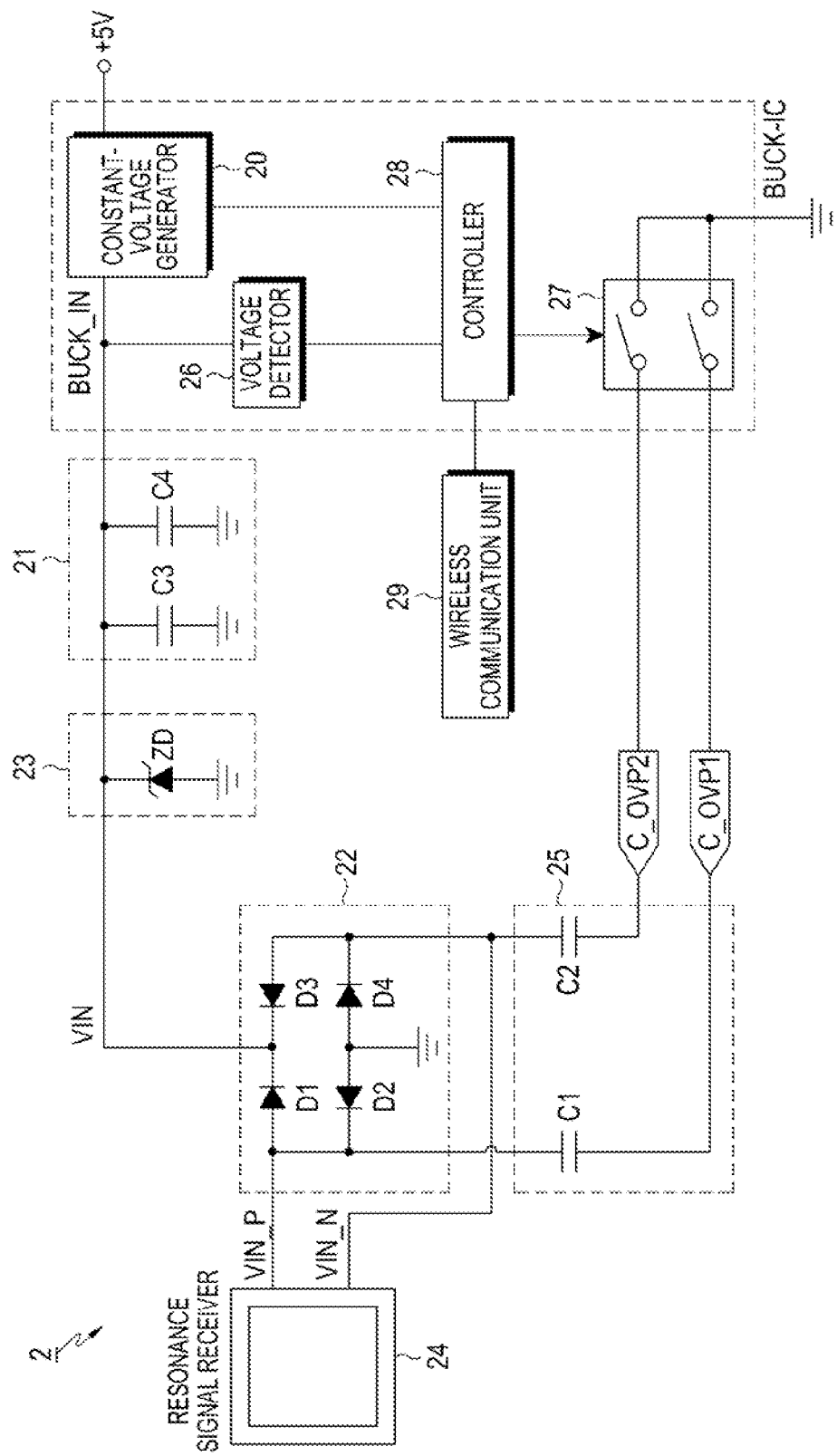
FIG. 2 illustrates a reception device of FIG. 1.

FIG. 1 illustrates a resonant wireless power transmission and reception system according to an embodiment of the present invention, and FIG. 2 illustrates a reception device of FIG. 1. Referring to FIGS. 1 and 2, the resonant wireless power transmission and reception system includes a wireless power transmission device 1, such as a charging device, and a wireless power reception device 2, such as one provided in a portable terminal.

The wireless power transmission device 1 may include a signal generator which includes a Voltage Control Oscillator (VCO), to generate a signal of a preset frequency such as a 6.78 MHz resonance frequency; an amplifier 12 which includes an amplification unit that amplifies the signal generated by the signal generator 10 to a high-power signal; a resonance signal generator 14 which includes a resonator that generates a wireless resonance signal, for example, of 6.78 MHz according to the high-power signal generated by the amplifier 12; a voltage/current detector 16 that senses (a peak level of) voltage and current of the wireless resonance signal generated by the resonance signal generator 14; and a controller 18 that collectively controls a wireless power transmission operation of the wireless power transmission device 1, and controls operations of the signal generator 10 and the amplifier 12 to maintain a value in a normal range by monitoring a current and a voltage of a wirelessly transmitted resonance signal based on the current and voltage detected by the voltage/current detector 16.

The wireless power transmission device 1 may further include a sensor 17 which includes an object sensor that provides a sensing signal to the controller 18 by sensing placement of the wireless power reception device 2, and a wireless communication unit 19 configured to use one selected from among various wireless near-field communication schemes for communication with the wireless power reception device 2 in relation to the wireless power transmission operation under control of the controller 18.

The controller 18 of the wireless power transmission device 1 may include a Micro Control Unit (MCU) (not shown), and may be configured to monitor a value detected by the voltage/current detector 16 through an Analog/Digital Conversion (ADC) port (not shown). In particular, the controller 18 determines a periodic impedance change, which is induced by an over-voltage protection circuit of the wireless power reception device 2 and is detected by the voltage/current detector 16 for an over-voltage protection operation, and adjusts a power supply level of the wireless power transmission device 1. The over-voltage protection operation of the controller 18 of the wireless power transmission device 1 according to the present invention will be described later in detail with reference to FIG. 3B.

The wireless power reception device 2 may include a resonance signal receiver 24 which includes a resonator, to receive a wireless resonance signal transmitted from the resonance signal generator 14 of the wireless power transmission device 1, a rectifier 22 that rectifies Alternating Current (AC) power received in the resonance signal receiver 24 into Direct Current (DC) power, a smoother 21 that smoothes the DC power rectified by the rectifier 22, a constant-voltage generator 20 that converts the power output from the smoother 21 into operating power (e.g., +5V) desired by the portable terminal to which the wireless power reception device is applied, an over-voltage protector 25 which is driven by a driver 27 to detune a resonance frequency of the resonator of the resonance signal receiver 24 during an over-voltage protection operation, thereby reducing reception power, a voltage detector 26 that detects an input voltage of the constant-voltage generator 20, and a controller 28 which is implemented with an MCU or the like for collectively controlling a wireless power reception operation of the wireless power reception device 2, determining whether an over-voltage occurs according to the signal detected by the voltage detector 26, and outputting a control signal for driving the over-voltage protector 25 to the driver 27 for the over-voltage protection operation if determining that the over-voltage occurs.

The wireless power reception device 2 may further include a wireless communication unit 29 which uses one selected from among various wireless near-field communication schemes to communicate with the wireless power transmission device 1 in relation to the wireless power reception operation under control of the controller 28, and a waveform stabilizer (not shown) which includes an LC circuit to stabilize and output a DC waveform output from the constant-voltage generator 20.

Referring to FIG. 2, the rectifier 22 may have a full-bridge diode structure using four diodes D1, D2, D3, and D4, in which for example, a serial connection circuit of the first and second diodes D1 and D2 and a serial connection circuit of the third and fourth diodes D3 and D4 are connected in parallel, and out of two nodes connected in parallel, a connection node of the first and third diodes D1 and D3 is set to be an output node of a DC power Input Voltage signal (VIN), and a connection node of the second and fourth diodes D2 and D4 is connected with a ground terminal.

A terminal VIN_P out of two connection terminals VIN_P and VIN_N of the resonator of the resonance signal receiver 24 is connected with a connection point of the first and second diodes D1 and D2, and the other terminal VIN_N is connected with a connection point of the third and fourth diodes D3 and D4.

The smoother 21 may include at least one of parallel-connected capacitors C3 and C4.

The constant-voltage generator 20 is provided with the output of the rectifier 30 through the smoother 21 and converts the rectified DC power into the DC power of a desired level. To this end, the constant-voltage generator 20 may include a step-down converter such as a DC-DC buck converter including a Low Drop Output (LDO).

The over-voltage protector 25 may include resonance-detuning first and second capacitors C1 and C2 having ends that are connected to the two connection terminals VIN_P and VIN_N of the resonator of the resonance signal receiver 24, respectively.

The driver 27 may have a switch structure in which the driver 27 performs a switching operation according to a control signal output from the controller 28 to connect the other terminals (C_OVP1, C_OVP2) of the first and second capacitors C1 and C2 of the over-voltage protector 25 to the ground terminal.

The controller 28 in a normal state controls a switching state of the driver 27 to be an open state, such that the other terminals (C_OVP1, C_OVP2) of the first and second capacitors C1 and C2 of the over-voltage protector 25 maintain the open state. In this case, the first and second capacitors C1 and C2 of the over-voltage protector 25 do not affect the resonator of the resonance signal receiver 24. In the over-voltage protection operation, the controller 28 controls the switching state of the driver 27 to be a connected state, such that the other terminals (C_OVP1, C_OVP2) of the first and second capacitors C1 and C2 of the over-voltage protector 25 are connected with the ground terminal, and in this case, the first and second capacitors C1 and C2 of the over-voltage protector 25 affect the resonator of the resonance signal receiver 24, detuning the resonance frequency. As a result, the signal transmitted from the wireless power transmission device 1 cannot be received efficiently, which detrimentally affects the power transmission.

The constant-voltage generator 20, the voltage detector 26, the controller 28, and the driver 27 may be configured in the form of a single Integrated Circuit (IC) chip (BUCK-IC).

Referring to FIG. 2, although not shown in FIG. 1, an auxiliary over-voltage protector 23 including a Zener Diode (ZD) may be further included between the rectifier 22 and the smoother 21 for additional circuit protection. The auxiliary over-voltage protector 23 is not essential, but may be further included to supplement the over-voltage protection function. The ZD may be set such that for example, a breakdown voltage is 30V to prevent an output voltage VIN of the rectifier 22 from exceeding a preset level.

When the over-voltage protector is implemented with only the ZD, over-voltage protection is difficult to achieve in a preparation period corresponding to a time required for the ZD to operate, and if the amount of power from the output voltage VIN of the rectifier 22 to an input voltage BUCK_IN of the constant-voltage generator 20 is large, the necessary capacity and size of the ZD have to be undesirably increased. Generally, a ZD having a size of about 1608 (16×08 mm) may protect a circuit of about 300 mW. Thus, to protect 1 W in a portable mobile device, three or more parts of a size of 1608 or larger have to be used. Since a reception stage of a cellular phone or mobile wireless charging resonance system has a small mounting space for a product, such that over-voltage protection should be performed in a small-area region, the reception stage should be protected up to 5 W for a cellular phone and up to 10 W for a tablet phone or a Personal Computer (PC). This requirement is difficult to achieve when the over-voltage protection circuit is implemented only with the ZD.

Therefore, in the reception device of the present invention, the over-voltage protection circuit is implemented by using resonance-detuning capacitors (two 1005 parts).

Figure 3A:
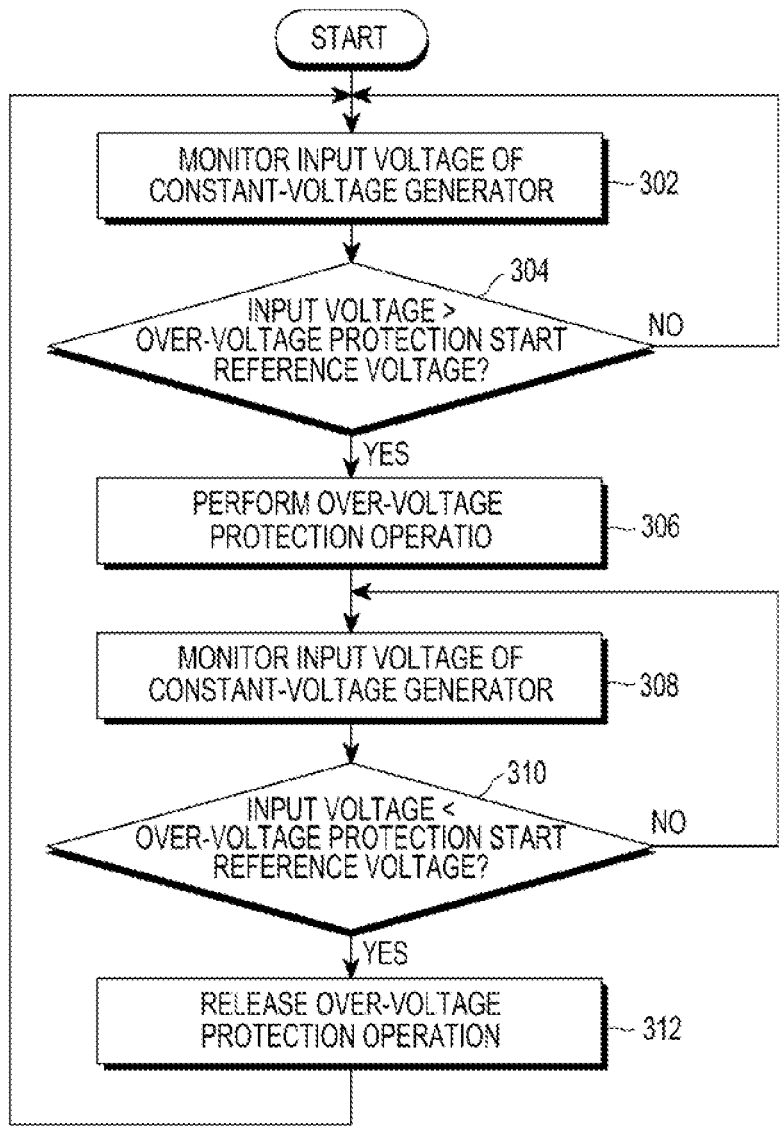
FIG. 3A illustrates over-voltage protection of a controller of a reception device of FIG. 1.

FIG. 3A illustrates over-voltage protection of the controller 28 of the reception device 2 of FIG. 1. Referring to FIG. 3A, the controller 28 of the reception device 2 monitors the input voltage BUCK_IN of the constant-voltage generator 20 through an output of the voltage detector 26 in step 302. Thereafter, in step 304, the controller 28 determines whether the input voltage BUCK_IN is greater than or equal to a preset over-voltage protection start reference voltage (e.g., 25.7V). If the input voltage BUCK_IN is not greater than or equal to the preset over-voltage protection start reference voltage, the monitor 28 continues the input voltage monitoring operation of step 302. Unless the input voltage BUCK_IN is greater than or equal to the preset over-voltage protection start reference voltage, the monitor 28 proceeds to step 306 to perform an over-voltage operation.

The over-voltage protection operation of step 306 is performed after a reaction time elapses (of about 10 microseconds (μs) or less) after the input voltage BUCK_IN increases, for example, to 25.7V. The controller 28 outputs a control signal to the driver 27 to connect the pins C_OVP1 and C_OVP2 of the over-voltage protector 25 to the ground terminal, such that the over-voltage level decreases. In this state, the controller 28 may transmit a signal indicating that the current state of the reception device 2 is an over-voltage protection operation state, and according to this signal, the wireless communication unit 29 transmits information indicating that the reception device 2 is currently in the over-voltage protection operation state to the transmission device 1.

In step 308, the controller 28 monitors the input voltage BUCK_IN of the constant-voltage generator 20. In step 310, the controller 28 determines whether the input voltage BUCK_IN is less than or equal to a preset over-voltage protection-release reference voltage (e.g., 24.8V. If the input voltage BUCK_IN is not less than or equal to the preset over-voltage protection-release reference voltage, the controller 28 continues the input voltage monitoring operation of step 308. Unless the input voltage BUCK_IN is less than or equal to the preset over-voltage protection-release reference voltage, the monitor 28 proceeds to step 312 to release the over-voltage operation.

As to a procedure for releasing the over-voltage protection operation in step 312, if the over-voltage protection operation is performed in step 306 and thus the input voltage BUCK_IN decreases to below 24.8V, an over-voltage recovery operation is performed, such as 700-1000 μs, and then the controller 28 outputs a control signal to the driver 27 to control the switch structure of the driver 27 to have an open state, such that the pins C_OVP1 and C_OVP2 of the over-voltage protector 25 are opened. Thus, the over-voltage protector 25 is deactivated.

After the over-voltage protection operation is released in step 312, the controller 28 returns to step 302 to repeat the foregoing process. If over-voltage occurrence conditions in the reception device 2 are not solved, the over-voltage protection operation and the over-voltage protection-release operation may be repetitively performed.

Figure 4:
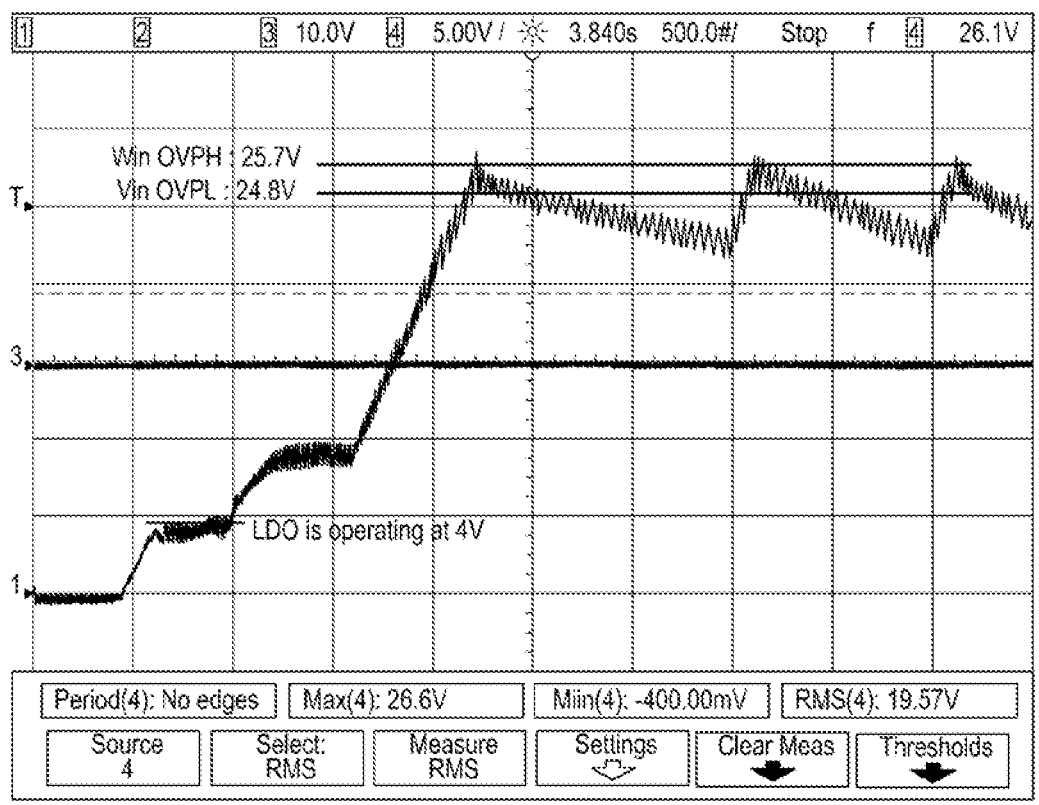
FIG. 4 illustrates a voltage waveform applied to a constant-voltage generator of a reception device of FIG. 2.

FIG. 4 illustrates a voltage waveform applied to the constant-voltage generator 20 of the reception device 2 of FIG. 2, showing a waveform of a continuance of the over-voltage protection operation and the over-voltage protection-release operation continue when the over-voltage occurrence conditions are not solved. Referring to FIG. 4, after an initial wireless power reception operation, the internal 3V Low DropOut (LDO) of the constant-voltage generator 20 operates when the output voltage VIN of the rectifier 22 is about 4V. Then the waveform of the output voltage VIN increases and at 4V, the waveform becomes level for about 250 μS. Thereafter, the output voltage VIN continuously increases.

The 3V LDO supplies power (3V, 40 mA max) to the external controller 28 (e.g., the MCU). A boot-up time that can be controlled by a General Purpose Input/Output (GPIO), which is the external controller 28, is 7.2 mS. The constant-voltage generator 20 operates, e.g., at the input voltage BUCK_IN of 5.5V, and outputs a constant voltage such as 5V.

Thereafter, an over-voltage protection operation starts after a response time at the output voltage VIN of, for example, 25.7V. The pins C_OVP1 and C_OVP2 of the over-voltage protector 25 are connected to the ground terminal by means of the switch structure of the driver 27. Then, a signal OVP which indicates the over-voltage protection operation state is activated by the controller 28 (signal OVP L=>H: over-voltage protection operation state).

At the output voltage VIN of 24.8V or less, for example, the over-voltage protection operation is released after an over-voltage recovery time. In this state, the pins C_OVP1 and C_OVP2 are opened and the signal OVP is deactivated by the controller 28 (signal OVP H=>L: normal state).

As the over-voltage protection operation and the over-voltage protection-release operation are continued when the over-voltage occurrence conditions are not solved in the reception device 2, the output voltage VIN periodically shows a waveform which rises over the over-voltage protection start reference voltage (e.g., 25.7V) and falls below the over-voltage protection-release reference voltage (e.g., 24.8V).

Figure 5A:
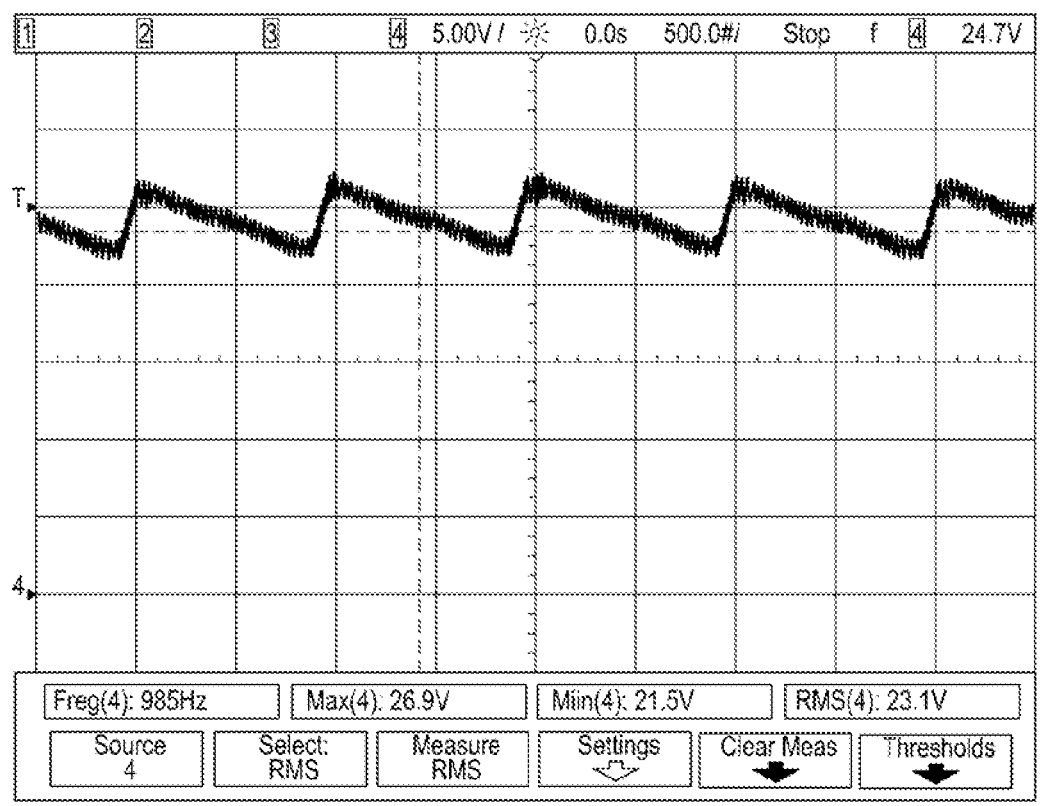
FIGS. 5A through 5C illustrate voltage waveforms applied to a constant-voltage generator for respective set capacities of respective detuning capacitors included in an over-voltage protector of a reception device of FIG. 2.
Figure 5B:
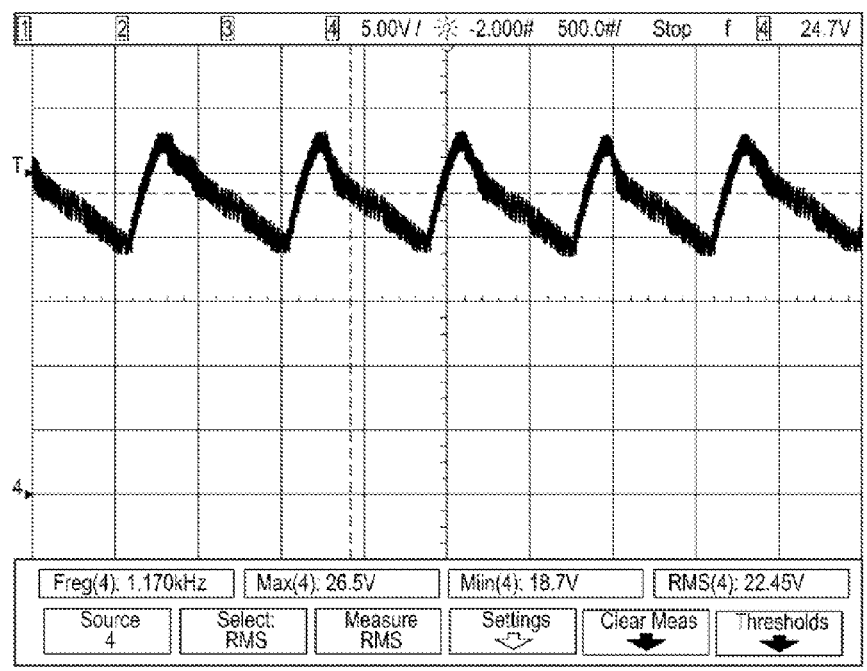
Figure 5C:
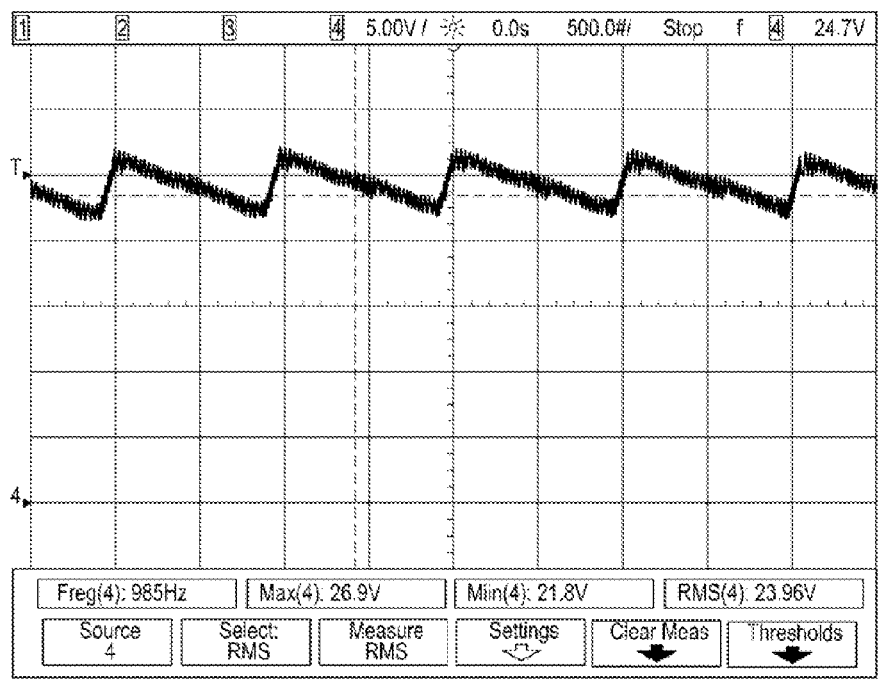

FIGS. 5A through 5C illustrate voltage waveforms applied to the constant-voltage generator 20 for respective set capacities of the respective detuning capacitors C1 and C2 included in the over-voltage protector 25 of the reception device 2 of FIG. 2, in which a periodic waveform of the input voltage BUCK_IN applied to the constant-voltage generator 20 when the over-voltage occurrence conditions are not solved is shown.

FIGS. 5A through 5C illustrate the waveforms of the input voltage BUCK_IN when the capacities of the detuning first and second capacitors C1 and C2 of the over-voltage protector 25 are 2.2 nanoFarads (nF), 4.7 nF, and 22 nF, respectively. It can be seen that when the capacities of the detuning capacitors are different (as will be described below, for the capacity of 2.2 nF or more), the respective waveforms show periodicity without any significant difference therebetween.

However, for the capacity of 2.2 nF or less, the over-voltage protection operation is not performed effectively, as will be described below in detail with reference to FIG. 6.

Figure 6:
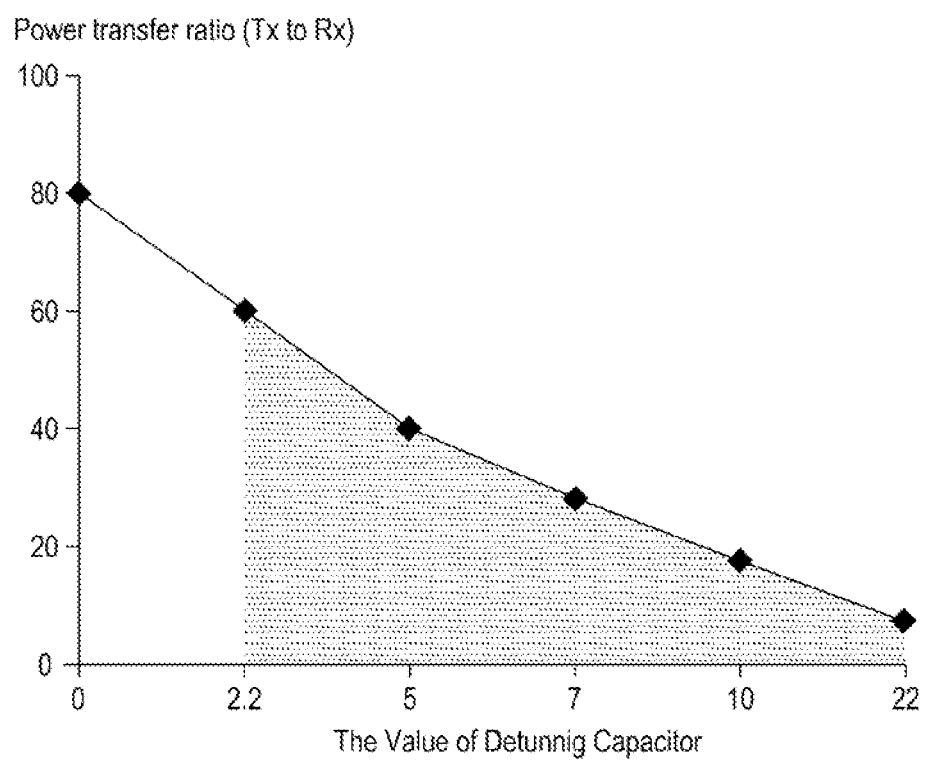
FIG. 6 illustrates a rate of power transferred from a transmission device to a reception device with respect to a set capacity of each detuning capacitor included in an over-voltage protector of a transmission device of FIG. 2.
Figure 7A:
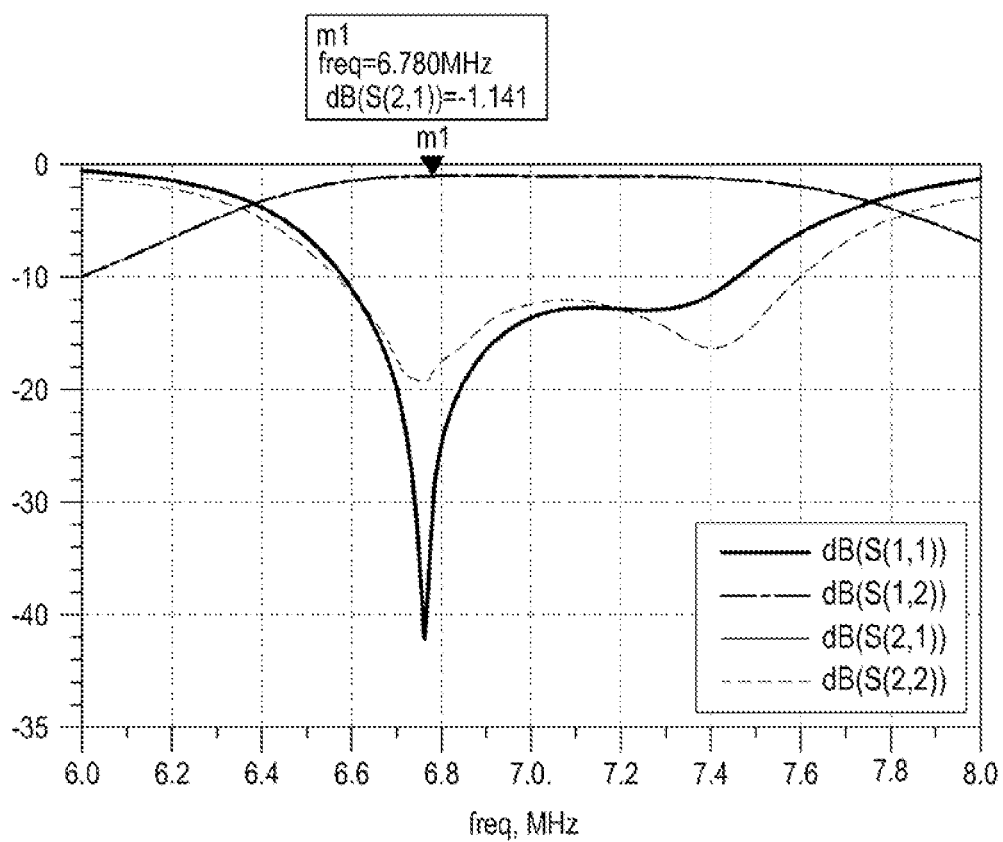
FIGS. 7A through 7F illustrate a rate of power transferred from a transmission device to a reception device with respect to a set capacity of each detuning capacitor included in an over-voltage protector of a reception device of FIG. 2.

FIG. 6 illustrates a rate of power transferred from the transmission device 1 to the reception device 2 with respect to a set capacity of each detuning capacitor included in the over-voltage protector 25 of the transmission device 2 of FIG. 2, and FIGS. 7A through 7F illustrate a rate of power transferred from the transmission device 1 to the reception device 2 with respect to a set capacity of each detuning capacitor included in the over-voltage protector 25 of the reception device 2 of FIG. 2. FIG. 7A illustrates when the detuning capacitors are open (or a normal state when there is no capacitor), and FIGS. 7B through 7F illustrate when the capacities of the detuning capacitors are 2.2 nF, 5.0 nF, 7.0 nF, 10.0 nF, and 22.0 nF, respectively.

Referring to FIGS. 6 and 7A through 7F, once the pins C_OVP1 and C_OVP2 for the detuning capacitors are opened, a rate of power transferred from the transmission device (resonator) to the reception device (resonator), S21, is about 80-90%, indicating that power transmission from the transmission device to the reception device has been successfully performed.

Figure 7B:
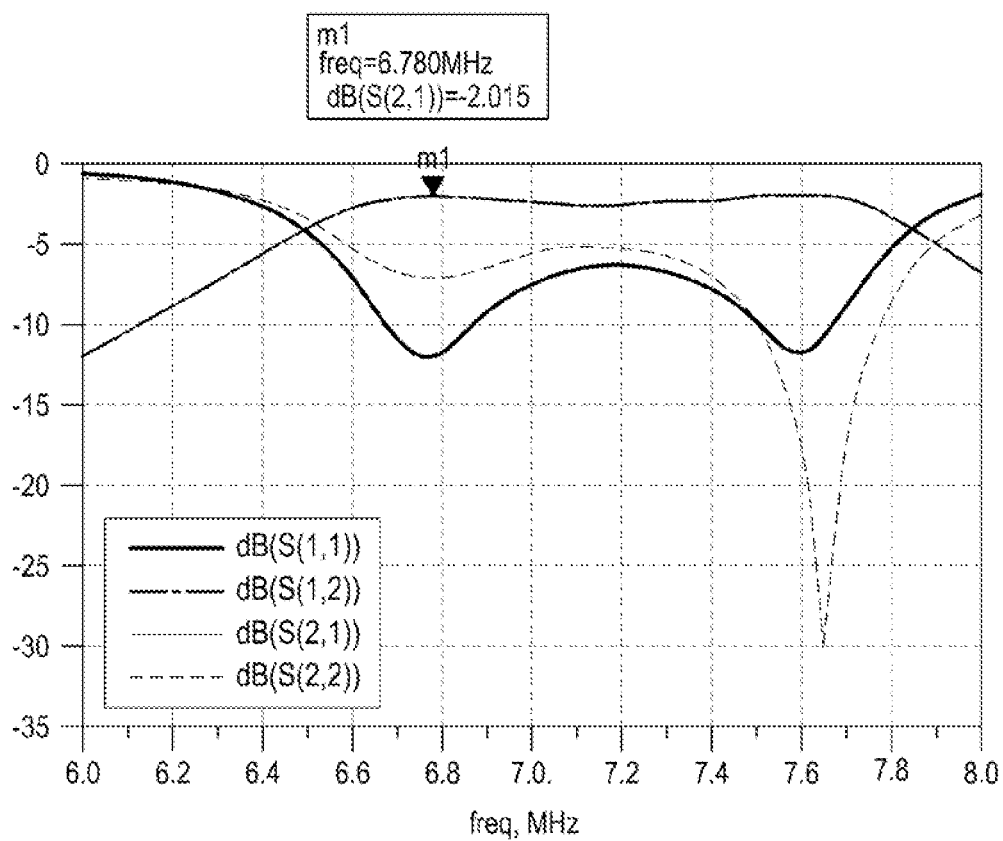
Figure 7C:
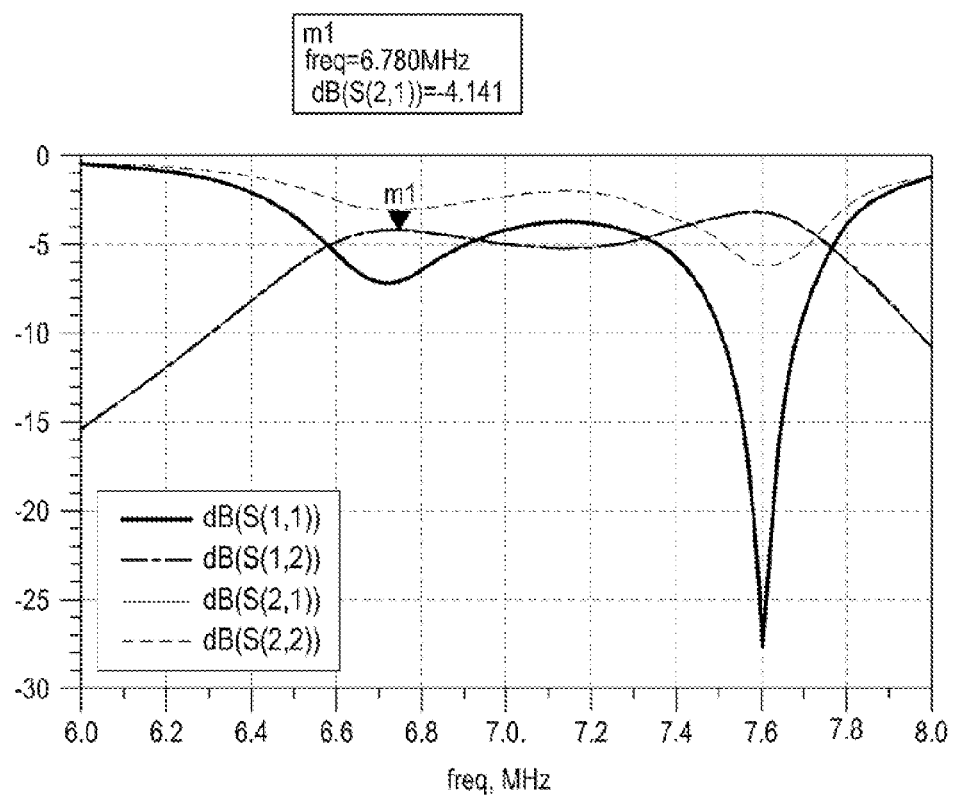
Figure 7D:
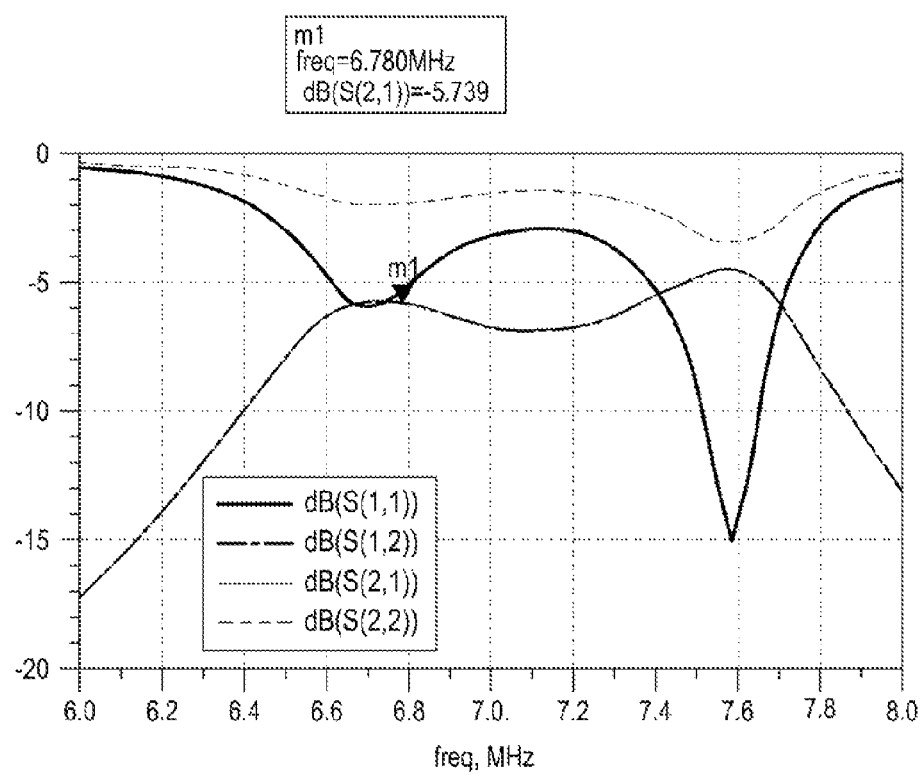
Figure 7E:
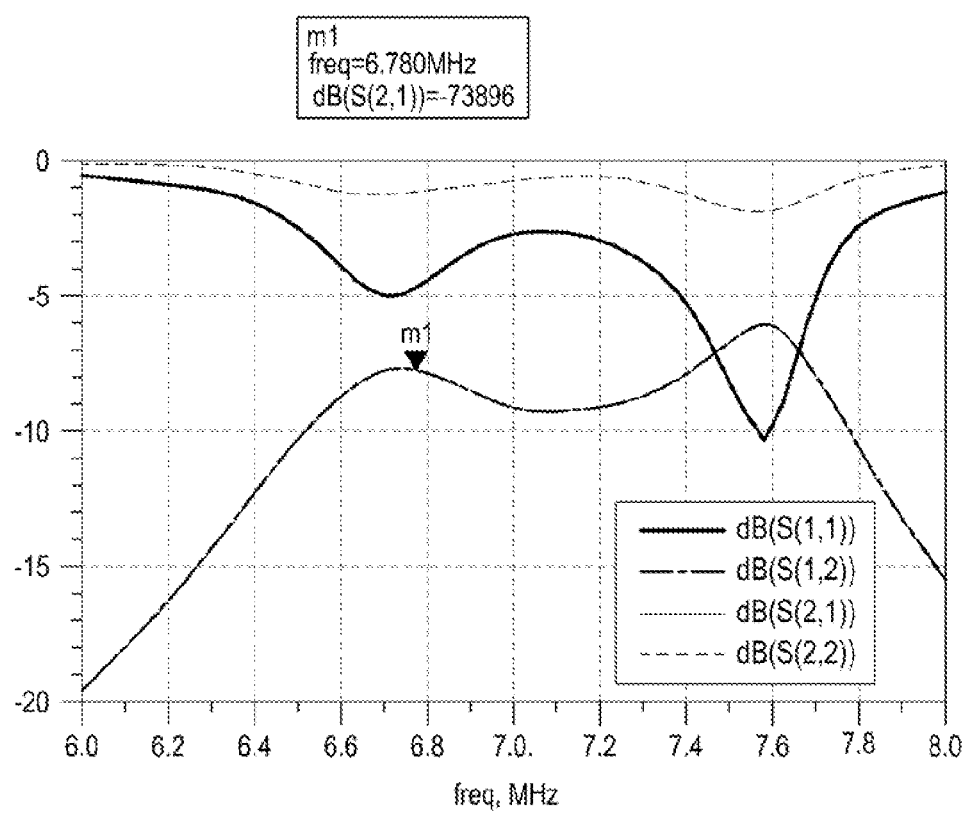
Figure 7F:
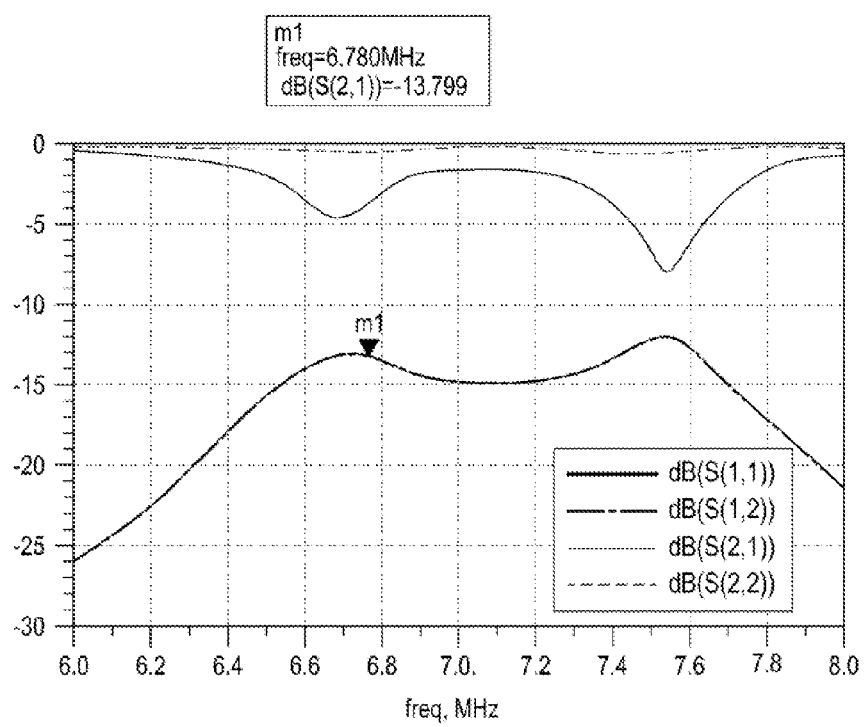

As shown in FIG. 7B, if the capacities of the detuning capacitors are 2.2 nF, upon connection of the pins C_OVP1 and C_OVP2 to the ground terminal, about 60% of the transmission power is transferred to the reception device. Likewise, as shown in FIGS. 7C and 7F, when the capacities of the detuning capacitors are 5.0 nF, 7.0 nF, 10.0 nF, and 22.0 nF, respectively, about 38.5%, 26.7%, 13.2%, and 4.1% of the transmission power are transferred, respectively. In FIG. 7F, for the capacity of 2.2 nF, S21 is 4.1%, such that little or no power transmission is performed.

In the above description, if the capacity of the detuning capacitor is too small (e.g., 2 nF or less), S21 is 61%, such that even if the over-voltage protection operation is performed, over-voltage protection may not be achieved and thus the voltage may continuously increase. This is because the detuning effect is not large even if the over-voltage protection operation is performed and thus the pins C_OVP1 and C_OVP2 for the detuning capacitors are connected with the ground terminal. In this case, the output voltage VIN continuously increases, which damages internal components of the reception device. When the detuning capacitor of 2.2 nF is used in which S21 of the power transferred from the transmission device to the reception device is experimentally reduced by 30%, S21 is about 60%.

Thus, in the present invention, the capacities of the detuning capacitors are set to a value in which ΔS21 is 30% or more, as given in Equation (1) by:

$$\Delta S21 = (S21) - (S21 \text{ in over-voltage protection state}) \quad (1)$$

It can be seen that S21, which is a rate of the power transmitted from the transmission device to the reception device, after execution of the over-voltage protection operation is 30% reduced from S21 before execution of the over-voltage protection operation.

In view of a Voltage Standing Wave Ratio (VSWR, reflection coefficient), transmission of power at 60% or less indicates that a reflection coefficient is greater than 4. That is, when the over-voltage protection operation is executed, VSWR≥4.

In view of a Q value, a change of the Q value is more than 0.1. That is, Q may be expressed in Equation (2) as follows:

$$Q = (\Delta f / 13.56) * 1.5 \ (\Delta f \text{ indicates a frequency variation}) \quad (2)$$

Thus, for example, for Δf=1 MHz, Q=0.11. As such, for the Q value of 0.1 or more, the frequency may be regarded as detuned.

As described above, the over-voltage protection operation is performed by detuning the resonance frequency at the reception device 2 using the detuning capacitors. The reception device has to continuously repeat the over-voltage protection operation when the over-voltage occurrence conditions are not solved, unless other measures are taken.

Moreover, the controller 28 of the reception device 2 may be configured to recognize the over-voltage state and transmit a message requesting the transmission device 1 to solve the over-voltage problem to the transmission device 1 through the wireless communication unit 29. Until over-voltage protection is performed, however, this process is very time-consuming. Therefore, it may be preferable that the transmission device 1 directly determines and then cancels the over-voltage state. In the present invention, therefore, the transmission device 1 instantly determines the over-voltage state of the reception device 2 and reduces the power transmitted from the transmission device 1, thereby protecting the reception device 1.

Figure 3B:
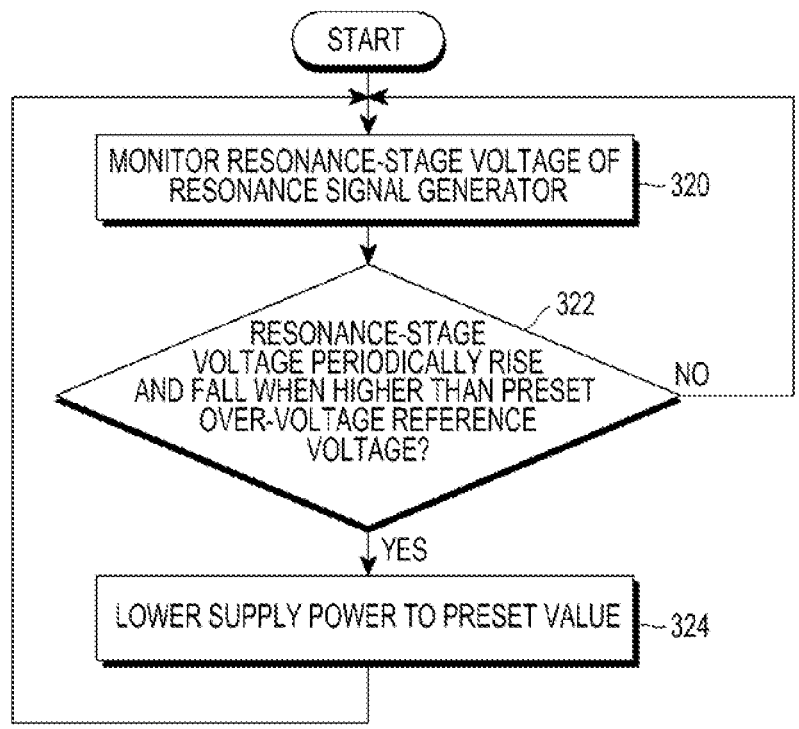
FIG. 3B illustrates over-voltage protection of a controller of a transmission device of FIG. 1.

FIG. 3B illustrates over-voltage protection of the controller 18 of the transmission device 1 of FIG. 1. Referring to FIG. 3B, the controller 18 monitors a resonance-stage voltage of the resonance signal generator 14 through an output of the voltage/current detector 16 in step 320. As the reception device 2 periodically executes the over-voltage protection operation and release operation as mentioned previously, the waveforms as shown in FIG. 4 or FIGS. 5A through 5C are generated. Likewise, (a peak value of) the voltage detected in the resonance stage of the transmission device 1 also exhibits a similar waveform. That is, even if the transmission device 1 transmits a constant output through the amplifier 12, the voltage of the resonator of the resonance signal generator 14 changes according to the frequency resonance.

In step 322, the controller 18 of the transmission device 1 determines whether rise and fall are repeated at particular intervals, such as 500 μS-2 mS when the resonance-stage voltage is sampled and a value thereof is larger than a preset over-voltage reference voltage (e.g., 15V) during a period. If corresponding determination conditions are not satisfied, the controller 18 returns to step 320 to continue monitoring the resonance-stage voltage, whereas if the determination conditions are satisfied, the controller 18 proceeds to step 324.

In step 324, the controller 18 of the transmission device 1 regards that the reception device 2 is currently in the over-voltage state, and thus controls the output of the transmission device 1 to be reduced by a value, such as 30% or higher, during a period. The controller 18 performs a control operation such that the output of the amplifier 12 is reduced. Herein, decreasing the output by 30% or more is an important factor because if the output is decreased by 30% or less, in spite of execution of the over-voltage protection operation, over-voltage protection is not achieved in the reception device 2 such that the voltage may continuously increase.

After execution of the operation of step 324, the controller 18 returns to step 320 to repeat the foregoing operation.

By executing the foregoing operation, even if the reception device 2 does not inform the transmission device 1 of the over-voltage situation, the transmission device 1 may automatically sense the over-voltage situation of the reception device 2 and reduce the transmission power, thereby handling the over-voltage situation. By reducing the transmission power, the over-voltage situation in the reception device 2 is released.

In addition, by monitoring the magnitude of the voltage transmitted from the transmission device 1, the transmission power for over-voltage protection is controlled, which conserves the time taken for the reception device 2 to receive a signal indicating the over-voltage situation, thereby rapidly protecting a circuit from the over-voltage state.

As such, the over-voltage protection scheme for the resonant wireless power transmission device according to the present invention may be realized. Embodiments of the present invention have been described in the foregoing description, but other embodiments or modifications or changes thereto may be made.

For example, while the reception device 2 corresponding to the transmission device 1 according to the present invention adopts a configuration using a resonance frequency detuning scheme in the foregoing description, the voltage waveform of the resonance stage sensed by the transmission device 1 may experience periodicity when the reception device 2 repeats the over-voltage protection operation and release operation even if the reception device 2 adopts an over-voltage protection circuit having other configurations. It can also be understood that the transmission device 1 according to the present invention effectively handles the over-voltage situation by performing the disclosed over-voltage protection operation.

In addition, while the transmission power is decreased by 30% for over-voltage protection in the transmission device 1 in the foregoing description, the transmission device 1 may shut down the transmission power for over-voltage protection.

In the foregoing description, the detuning capacitors in the reception device 2 are selectively connected with the ground terminal by the driver when they are connected to the resonance stage, but they may also be selectively connected with the resonance stage by the driver when being connected with the ground terminal.

The controller 28 of the reception device 2 may provide information regarding execution of the over-voltage protection operation to a portable terminal to which the reception device 2 is applied, such that the information is displayed on a display device of the portable terminal or may be output as an alarming sound through a speaker provided in the portable terminal.

In the reception device 2, the controller 28 may further decrease the over-voltage protection-release reference voltage or may transmit a message requesting stop of power transmission to the transmission device 1, if the over-voltage protection operation and release operation are continuously repeated at intervals.

As is apparent from the foregoing description, the over-voltage protection scheme for the resonant wireless power transmission device according to the present invention solves a size increase problem while offering rapid handling and high efficiency.

While embodiments of the present invention has been described, it will be obvious to those of ordinary skill in the art that various modifications can be made without departing from the scope of the present invention.

What is claimed is:

1. An over-voltage protection device for a resonant wireless power transmission device, the over-voltage protection device comprising:
   an amplifier for amplifying a transmission signal;
   a resonance signal generator for generating a wireless resonance signal according to the transmission signal amplified by the amplifier;
   a voltage detector for sensing a voltage of the wireless resonance signal generated by the resonance signal generator; and
   a controller for monitoring the voltage detected by the voltage detector to determine whether the voltage repetitively increases and decreases with periodicity when the voltage is greater than a reference voltage and when it is determined that the voltage is greater than a reference voltage and it is determined that the voltage of the resonance stage repetitively increases and decreases at a predetermined interval, controlling the amplifier to decrease an output of the transmission device by a value.

2. The over-voltage protection device of claim 1, wherein the periodicity of the voltage detected by the voltage detector is 500 microseconds (μS)-2 milliseconds (mS).

3. The over-voltage protection device of claim 1, wherein the amplifier is controlled to decrease the output of the transmission device by at least 30%.

4. The over-voltage protection device of claim 2, wherein the amplifier is controlled to decrease the output of the transmission device by at least 30%.

5. The over-voltage protection device of claim 1, wherein the amplifier is controlled to shut down the output of the transmission device during a preset period.

6. The over-voltage protection device of claim 2, wherein the amplifier is controlled to shut down the output of the transmission device during a preset period.

7. An over-voltage protection method of an over-voltage protection device for a resonant wireless power transmission device, the over-voltage protection method comprising:
   monitoring a voltage of a wireless resonance signal of a resonance stage;
   determining whether the voltage of the resonance stage, when the voltage is greater than a reference voltage, repetitively increases and decreases with periodicity; and
   when it is determined that the voltage is greater than a reference voltage and it is determined that the voltage of the resonance stage repetitively increases and decreases at a pre-determined interval, decreasing an output of the transmission device by a value.

8. The over-voltage protection method of claim 7, wherein the periodicity of the voltage of the resonance stage is 500 microseconds (μS)-2 milliseconds (mS).

9. The over-voltage protection method of claim 7, wherein decreasing the output of the transmission device by the preset value comprises decreasing the output of the transmission device by at least 30%.

10. The over-voltage protection method of claim 8, wherein decreasing the output of the transmission device by the preset value comprises decreasing the output of the transmission device by at least 30%.

11. The over-voltage protection method of claim 7, wherein decreasing the output of the transmission device by the preset value comprises shutting down the output of the transmission device during a period.

12. The over-voltage protection method of claim 8, wherein decreasing the output of the transmission device by the preset value comprises shutting down the output of the transmission device during a period.

* * * * *